(12) United States Patent
Nemec

(10) Patent No.: US 11,034,896 B2
(45) Date of Patent: Jun. 15, 2021

(54) PROCESS FOR ACTIVATION AND OPERATION OF A HYDROCARBON UPGRADING CATALYST

(71) Applicant: BP P.L.C., London (GB)

(72) Inventor: Larry Nemec, Houston, TX (US)

(73) Assignee: BP P.L.C., London (GB)

( * ) Notice: Subject to any disclaimer, the term of this patent is extended or adjusted under 35 U.S.C. 154(b) by 0 days.

(21) Appl. No.: 16/330,935

(22) PCT Filed: Sep. 4, 2017

(86) PCT No.: PCT/EP2017/072130
§ 371 (c)(1),
(2) Date: Mar. 6, 2019

(87) PCT Pub. No.: WO2018/046449
PCT Pub. Date: Mar. 15, 2018

(65) Prior Publication Data
US 2019/0233745 A1 Aug. 1, 2019

Related U.S. Application Data

(60) Provisional application No. 62/383,694, filed on Sep. 6, 2016.

(51) Int. Cl.
*C10G 47/02* (2006.01)
*C10G 47/10* (2006.01)
(Continued)

(52) U.S. Cl.
CPC .............. *C10G 47/14* (2013.01); *B01J 23/42* (2013.01); *B01J 23/44* (2013.01); *B01J 23/882* (2013.01);
(Continued)

(58) Field of Classification Search
None
See application file for complete search history.

(56) References Cited

U.S. PATENT DOCUMENTS 3,211,642 A  10/1965  Unverferth
3,586,620 A   6/1971  Conner
(Continued)

OTHER PUBLICATIONS

Choi, J-G. "Reduction of supported cobalt catalysts by hydrogen" Catalysis Letters 35 (1995) 291-296 (Year: 1995).*
(Continued)

*Primary Examiner* — Medhanit W Bahta
(74) *Attorney, Agent, or Firm* — McDonnell Boehnen Hulbert & Berghoff LLP

(57) ABSTRACT

The present invention provides a process for upgrading a Fischer-Tropsch product by hydrocracking in the presence of a hydrocracking catalyst in a reactor, wherein the process is initiated by a series of steps (i) to (iv). The hydrocracking catalyst is (i) contacted with a hydrogen-containing stream having a feed temperature of from 360° C. to 420° C.; (ii) the feed temperature of the hydrogen-containing stream is reduced to a temperature of from 220° C. to 280° C.; (iii) the catalyst is contacted with a Fischer-Tropsch product stream having a feed temperature of from 220° C. to 280° C., which is co-fed with the hydrogen-containing stream; and (iv) the catalyst is co-fed with a Fischer-Tropsch product stream and hydrogen-containing stream having feed temperatures of from 380° C. and 400° C. for at least four days and wherein the hydrocracking catalyst is not activated by sulfiding.

17 Claims, 1 Drawing Sheet

(51) Int. Cl.
*C10G 47/14* (2006.01)
*B01J 23/42* (2006.01)
*B01J 23/44* (2006.01)
*B01J 23/882* (2006.01)

(52) U.S. Cl.
CPC .............. *C10G 47/02* (2013.01); *C10G 47/10* (2013.01); *B01J 2523/68* (2013.01); *B01J 2523/824* (2013.01); *B01J 2523/828* (2013.01); *B01J 2523/845* (2013.01); *C10G 2300/1022* (2013.01); *C10G 2300/4006* (2013.01); *C10G 2300/703* (2013.01)

(56) References Cited

U.S. PATENT DOCUMENTS

| | | |
|---|---|---|
| 3,861,005 A | 1/1975 | Steinmetz |
| 7,973,086 B1 | 7/2011 | Saxton |
| 2006/0011512 A1 | 1/2006 | Espinoza |
| 2006/0189504 A1 | 8/2006 | Dirkzwager |

OTHER PUBLICATIONS

Matheson "Hydrogen" Jun. 7, 2013, pp. 1-4 (Year: 2013).*
Kang, J. et al. "Hydrocracking and Hydroisomerization of n-Hexadecane, n-Octacosane and Fischer-Tropsch Wax Over a Pt/SiO2—Al2O3 Catalyst," Catalysis Letters 142(11): 1295-1305 (2012).
International Search Report for International Application No. PCT/EP2017/072130, dated Nov. 20, 2017.
Written Opinion of the International Searching Authority for International Application No. PCT/EP20171072130, dated Nov. 20, 2017.

* cited by examiner

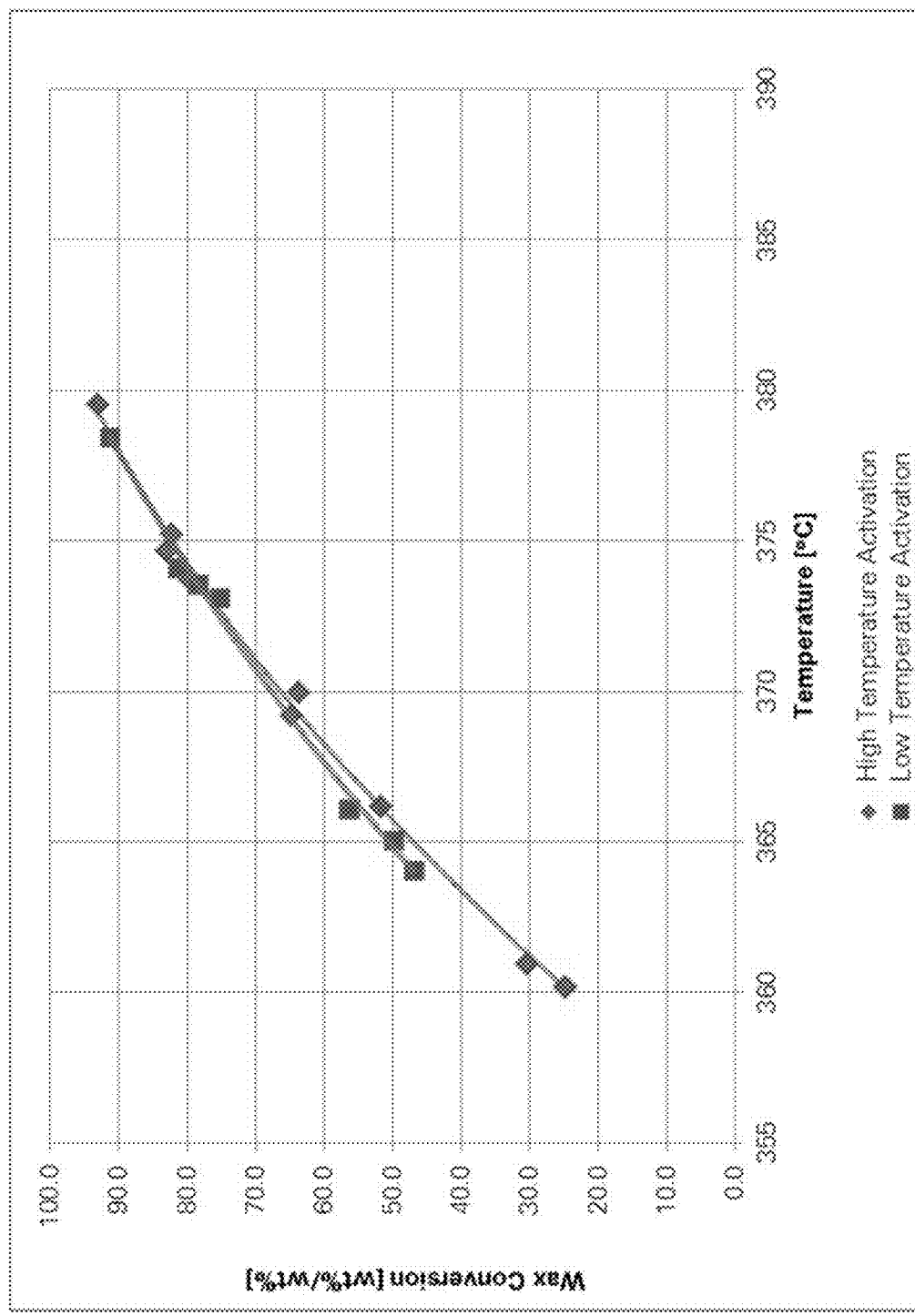

PROCESS FOR ACTIVATION AND OPERATION OF A HYDROCARBON UPGRADING CATALYST

This application is a national stage application under 35 U.S.C. § 371 of International Application No. PCT/EP2017/072130, filed Sep. 4, 2017, which claims priority to U.S. Patent Application No. 62/383,694, filed Sep. 6, 2016, the disclosures of which are explicitly incorporated by reference herein.

The present invention relates to a process for upgrading a Fischer-Tropsch product by hydrocracking with a hydrocracking catalyst. In particular, the process of the present invention involves an initiation procedure for activating the hydrocracking catalyst without sulfiding, said initiation procedure comprising contacting the catalyst with hydrogen at a particular temperature before co-feeding a Fischer-Tropsch product to the system.

In the production of hydrocarbons from either the separation of crude oil or from a Fischer-Tropsch process, a significant proportion of the hydrocarbon product consists of heavy hydrocarbons and waxes. These products are generally far less desirable than the lighter fractions, such as kerosene or diesel, and it is therefore beneficial to convert such heavy hydrocarbons into the lighter fractions.

Heavy hydrocarbons are converted to the lighter fractions by a process of cracking, of which there are several forms. Thermal cracking involves converting a heavy hydrocarbon into lighter fractions at high temperatures and pressures. Thermal cracking has largely been replaced with catalytic cracking processes such as fluid catalytic cracking and hydrocracking. Fluid catalytic cracking often uses zeolite based catalysts and results in a mixture of olefins and alkanes. Hydrocracking corresponds to a process whereby heavy hydrocarbons are converted to lighter fractions in the presence of hydrogen and a catalyst. Hydrocracking catalysts are well known and often comprise a metal sulphide compound, which is typically generated by an activation procedure involving reduction of an oxidised metal component by sulfiding. This is often achieved by contact with a gaseous mixture comprising a reducing gas, such as hydrogen, and a sulfurous stream, such as a stream containing hydrogen sulfide.

For low sulfur hydrocarbon feedstocks, such as the heavy hydrocarbon products of a Fischer-Tropsch process, it is generally desirable to prevent sulfur entering the product stream for environmental reasons. In these cases, non-sulfided hydrocracking catalysts can be used, wherein the hydrocracking catalyst may, for instance, be activated by reduction with hydrogen in the absence of a sulfiding step.

Historically, the presence of significant amounts of water has been found to interfere with activation procedures incorporating reduction and optional sulfiding steps. This has led to the use of complicated high-temperature drying procedures for reactor units and also the use of high-temperature hydrogen reductions, often together with efficient removal of water produced from the reduction from the reactor, prior to sulfiding.

U.S. Pat. No. 3,211,642 discloses a process for preparing an activated nickel sulfide hydrocracking catalyst incorporating a reductive activation procedure, wherein the final stage of reduction sees the catalyst exposed to a reducing gas, such as hydrogen, at temperatures preferably from 850° F. to 950° F. (454° C. to 510° C.). Exposure to reducing gas is said to be typically performed for around 24 hours or even longer, so as to ensure complete reduction. The reduction step itself gives rise to the formation of water and it is said to be important for there to be sufficient volume of reducing gas flowing over the catalyst to rapidly remove the reduction products to prevent contact with the catalyst.

U.S. Pat. No. 3,861,005 discloses a catalytic isomerization of waxy hydrocarbons utilising a catalyst combination comprising a hydrogenation catalyst (e.g. Ni, Co, Mo, W, Pt, Pd, Re, Ru etc) and combinations thereof (e.g. NiCo, NiW, CoMo, NiMo etc) which is reduced under a flow of hydrogen at 1,000° F. (538° C.) for 2 hours (column 8, lines 36 to 40). In Example I of that document, the final reduction temperature is maintained at 1,000° F. (538° C.), before and after which numerous instances of water formation at the reactor outlet were noted. The flow of hydrogen was maintained at 1,000° F. (538° C.) for 2 hours before the reduced catalyst was cooled under nitrogen purge before being used in a hydrocracking reaction.

Thus, activation of the hydrocracking catalyst by reduction is preferred where the reducing gas is as dry as possible and there is sufficient flow of reducing gas across the catalyst to prevent reduction products (i.e. water) contacting the catalyst. Meanwhile, reduction temperatures above 450° C. are preferred for ensuring sufficient reduction and also for ensuring that the dew point of any water vapour in the reactor is well exceeded to also prevent contact with the catalyst. It is for these reasons that in commercial processes, such reduced non-sulfided catalysts are typically activated under a flow of hydrogen at temperatures of around 450° C. and above for several hours. As a consequence, the associated equipment needs to be built specifically for the high temperature operation during catalyst reduction which can have a substantial negative effect on the economic viability of the overall hydrocracking process.

It has been surprisingly found that hydrocracking catalysts, including those typically used in a sulfided form, can be advantageously activated by hydrogen gas without a sulfur source, at a lower temperature than is typically used in commercial processes, where activation involves subsequent co-feeding of a Fischer-Tropsch product at feed temperatures in the range of from 380° C. and 400° C., typically between 380° C. and 400° C., prior to committing the catalyst to the hydrocracking process. This activation procedure has been found to afford a reduced catalyst having comparable performance to reduced catalysts prepared at higher temperatures conventionally used in the prior art, without suffering any adverse effects. Thus, the present invention provides a catalyst activation which employs a temperature that may also be similar to, and not exceeding, the temperature of the subsequent hydrocracking reaction itself, meaning that the activation procedure can be more easily integrated into the overall hydrocracking process. Having the activation procedure and the subsequent hydrocracking reaction operate at the same temperature reduces running and set-up costs due to equipment being suitable for all steps of the process. Advantageously, the activation procedure is significantly less energy intensive than prior art process.

Thus, in a first aspect, the present invention provides a process for upgrading a Fischer-Tropsch product by hydrocracking in the presence of a hydrocracking catalyst in a reactor, wherein the process is initiated by a series of steps (i) to (iv). The hydrocracking catalyst is (i) contacted with a hydrogen-containing stream having a feed temperature in the range of from 360° C. to 420° C.; (ii) the feed temperature of the hydrogen containing stream is reduced to a temperature in the range of from 220° C. to 280° C.; (iii) the catalyst is contacted with a Fischer-Tropsch product stream having a feed temperature in the range of from 220° C. to 280° C., which is preferably co-fed with the hydrogen-containing stream for a period of at least 1 to 10 hours, more preferably 2 to 5 hours, for example for 2 hours; and (iv) the catalyst is contacted with the Fischer-Tropsch product stream and hydrogen-containing stream having feed temperatures in the range of from 380° C. and 400° C., preferably for a period of at least four days, i.e. at least 96 hours, and wherein the hydrocracking catalyst is not activated by sulfiding.

The initiation procedure according to process of the present invention provides an effective hydrocracking catalyst, with much lower energy consumption than conventional prior art activation procedures. More importantly, step (i) of the process of the present invention is advantageously conducted at a similar temperature to the hydrocracking temperature, reducing running and set-up costs due to equipment being suitable for all steps of the process. More specifically, the lower design temperature reduces the capital costs of the hydrocracker reactor vessel and supplemental equipment like heat exchange equipment and pumps. In step (ii), reducing the feed temperature of the hydrogen-containing stream, before co-feeding a Fischer-Tropsch product stream at a similar feed temperature in step (iii), has the advantage of eliminating the potential for a large exotherm, which can be dangerous and can lead to premature catalyst deactivation, when the Fischer-Tropsch product stream is first contacted with the catalyst. The hydrocracking reaction itself only proceeds at significant levels of conversion after steps (i) to (iii) have been completed and after the feed temperature is raised to the temperature in the range of from 380° C. to 400° C. in step (iv). The activation of the catalyst is believed to progress to completion during step (iv). Reference herein to "initiated" or "initiation" in regard to steps (i) to (iv) of the process of the present invention is intended to mean that these steps are required to complete the activation of the catalyst. Furthermore, "initiated" or "initiation" is also intended to mean that no other steps materially affecting the oxidative state of the hydrocracking catalyst are undertaken before step (i), after the supported catalyst is positioned within the reactor. In some embodiments, once the catalyst has been positioned in the reactor, a drying step may precede steps (i) to (iv) of the process, for instance by flowing an inert gas, preferably nitrogen, over the catalyst. Such a drying step is not considered to materially affect the oxidative state of the catalyst.

Hydrocracking is generally believed to proceed via dehydrogenation, protonation, and hydroisomerisation, thereby producing branched carbocations (Equations 1a to 1c), followed by a hydrocracking step involving β-scission, which produces shorter chain carbocations and olefins that are hydrogenated to shorter chain alkanes (Equations 2a and 2b).

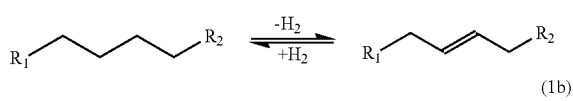

(1a)

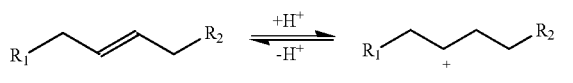

(1b)

(1c)

-continued

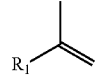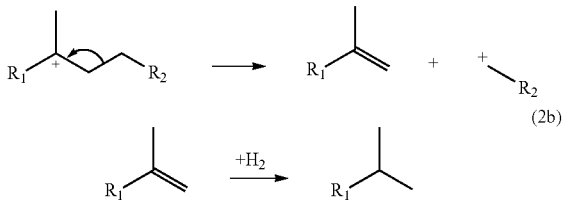

(2a)

(2b)

Hydrocracking catalysts typically comprise a hydrogenation/dehydrogenation component and an acidic component. The hydrogenation/dehydrogenation component often consists of at least one transition metal, and may also act as a hydroisomerisation catalyst. The acidic component typically comprises an acidic support material on which the metal or metals are supported.

The hydrocracking catalyst used in the process of the present invention may be selected from any of those known commonly in the art to be active in a hydrocracking process. In one embodiment, the catalyst may comprise a metal, or an oxide thereof, selected from iron, cobalt, nickel, platinum, palladium, rhenium, ruthenium, molybdenum, tungsten, or mixtures thereof.

In some or all embodiments, the hydrocracking catalyst comprises a mixture of a non-noble metal, such as iron, cobalt, or nickel, and optionally also a Group 6 metal, for example molybdenum or tungsten, which may also be in the form of metal oxides; for example, the hydrocracking catalyst comprises a iron, cobalt, or nickel, and optionally a Group 6 metal, for example molybdenum or tungsten, which may also be in the form of metal oxides. Preferably, the hydrocracking catalyst comprises a mixture of a non-noble metal, such as iron, cobalt, or nickel, and a Group 6 metal, for example molybdenum or tungsten, which may also be in the form of metal oxides.

In some or all embodiments of the present invention, the hydrocracking catalyst comprises platinum or palladium.

In a particularly preferred embodiment of the present invention, the hydrocracking catalyst comprises cobalt and molybdenum.

In some or all embodiments of the invention, the hydrocracking catalyst comprises a support. Preferably, the hydrocracking catalyst is supported on a conventional refractory support material, for example silica, alumina, silica/alumina, zeolites, ceria, zirconia, titania, and zinc oxide, more preferably the support is silica/alumina.

The supported catalyst may be prepared by any suitable method of which the skilled person is aware. For example, it may be prepared by impregnation, precipitation or gelation. A suitable catalyst may also be prepared by mulling or kneading alumina and/or silica with either soluble or insoluble metal compounds, before extruding, drying and calcining the product.

A suitable impregnation method, for example, comprises impregnating a support material with a metal compound which is thermally decomposable to the oxide form. Any suitable impregnation technique including the incipient wetness technique or the excess solution technique, both of which are well-known in the art, may be employed. The incipient wetness technique is so-called because it requires that the volume of impregnating solution be predetermined so as to provide the minimum volume of solution necessary to just wet the entire surface of the support, with no excess liquid. The excess solution technique as the name implies, requires an excess of the impregnating solution, the solvent being thereafter removed, usually by evaporation.

The impregnation solution may suitably be either an aqueous solution or a non-aqueous, organic solution of the thermally decomposable metal compound. Suitable non-aqueous organic solvents include, for example, alcohols, ketones, liquid paraffinic hydrocarbons and ethers. Alternatively, aqueous organic solutions, for example an aqueous alcoholic solution, of the thermally decomposable metal compound may be employed.

Impregnation may be conducted with a support material which is in a powder, granular or pelletized form. Alternatively, impregnation may be conducted with a support material which is in the form of a shaped extrudate.

A suitable precipitation method for producing the catalyst comprises, for example, the steps of: (1) precipitating, at a temperature in the range from 0° C. to 100° C., a metal in the form of an insoluble thermally decomposable compound thereof using a precipitant comprising ammonium hydroxide, ammonium carbonate, ammonium bicarbonate, a tetraalkylammonium hydroxide or an organic amine, and (2) recovering the precipitate obtained in step (1).

In contrast to impregnation methods, any soluble metal may be employed. Suitable salts include, for example, carboxylates, chlorides and nitrates. It is preferred to use aqueous solutions of the metal salt(s), although aqueous alcoholic solutions for example may be employed if desired.

As regards the precipitant, in addition to ammonium carbonate, ammonium bicarbonate and ammonium hydroxide, tetraalkylammonium hydroxides and organic amines may also be used. The alkyl group of the tetraalkylammonium hydroxide may suitably be a $C_1$ to $C_4$ alkyl group. A suitable organic amine is cyclohexylamine. Ammonium carbonate may suitably be used in a commercially available form, which comprises a mixture of ammonium bicarbonate and ammonium carbamate. Instead of using a pre-formed carbonate or bicarbonate it is possible to use the precursors of these salts, for example a soluble salt and carbon dioxide.

Irrespective of the method for preparing the metal-containing material, it is usually necessary to convert the metal-containing material into a catalyst comprising a metal in the oxide form, for subsequent activation in accordance with the present invention. Calcination may be used to afford a catalyst comprising a metal in the oxide form by, for instance, causing thermal-decomposition of a thermally decomposable metal compound formed previously. Calcination may be performed by any method known to those of skill in the art, for instance in a fluidized bed or rotary kiln at a temperature suitably in the range from 200° C. to 700° C.

In some preferred embodiments of the present invention, the hydrocracking catalyst comprises a previously used hydrocracking catalyst which has been at least partially deactivated. Thus, the present invention can also be particularly advantageous in cases where a hydrocracking system has suffered issues leading to catalyst de-activation by oxidation. The present invention may allow the catalyst to be reactivated following the initiation procedure of the present invention.

In accordance with step (i) of the process of the present invention, the hydrocracking catalyst is contacted with a hydrogen-containing stream having a feed temperature in the range of from 360° C. to 420° C. The process of the present invention therefore has the benefit that the hydrocracking catalyst activation is conducted at a temperature which does not exceed the subsequent hydrocracking temperature, reducing running and set-up costs due to equipment being suitable for all steps of the process. In preferred embodiments of the present invention, the hydrocracking catalyst is first contacted in step (i) with a hydrogen-containing stream having a feed temperature in the range of from 360° C. to 420° C., such as from 360° C. to 390° C., more preferably from 380° C. to 390° C., for example 385° C.

The pressure inside the reactor during contact step (i) of the process may be any desired pressure which is suitable for achieving hydrogen reduction. In some embodiments, the hydrocracking catalyst may be contacted with the hydrogen-containing stream in steps (i) through (iv) at atmospheric pressure. In other embodiments the hydrocracking catalyst may be contacted with the hydrogen-containing stream in steps (i) through (iv) at a pressure in the range of from 0.1 MPa to 10 MPa, such as in the range of from atmospheric pressure to 10 MPa, and preferably 7 MPa. The first contacting of the hydrocracking catalyst with the hydrogen-containing stream according to step (i) may be conducted over a period in the range of from 6 to 72 hours, such as from 6 to 36 hours, preferably from 20 and 30 hours, for example 24 hours.

Reference herein to a "hydrogen-containing stream" is intended to mean a gaseous stream comprising at least 50 wt. % hydrogen and the balance being preferably made up of inert diluents. Preferably, the hydrogen-containing stream comprises 80 wt. % or more hydrogen, more preferably 90 wt. % or more; most preferably 95 wt. % or more; with the balance being made up of inert gas diluents. Suitable inert gas diluents are nitrogen, argon, helium, methane. Preferably, the inert gas diluents are selected from nitrogen, argon and helium, more preferably, the inert gas diluent is nitrogen. The hydrogen containing stream used in the present invention should be free of sulfur and sulfur-containing compounds.

In accordance with step (ii) of the process of the present invention, the feed temperature of the hydrogen-containing stream is reduced to a temperature of from 220° C. to 280° C. This step of the process effectively cools the catalyst for subsequent contact with the Fischer-Tropsch product stream at low temperature in step (iii) of the process so as to minimise hydrocracking activity and avoid undesirable exotherms. In preferred embodiments of the present invention, following the first contacting of the hydrocracking catalyst with a hydrogen-containing stream in step (i), the feed temperature of the hydrogen-containing stream is reduced in step (ii) to a temperature in the range of from 240° C. and 260° C., preferably from 245° C. to 255° C., for example 250° C. The hydrogen-containing stream may be contacted with the hydrocracking catalyst at a gas hourly space velocity (GHSV) in the range from 100 NL/L h$^{-1}$ to 10000 NL/L h$^-$.

In accordance with step (iii) of the process of the present invention, the hydrocracking catalyst is contacted with a Fischer-Tropsch product stream having a feed temperature in the range of from 220° C. to 280° C. by co-feeding with the hydrogen-containing stream.

In preferred embodiments of the present invention, the catalyst is contacted with a Fischer-Tropsch product having a feed temperature in the range of from 240° C. to 260° C., more preferably from 245° C. to 255° C., for example 250° C., during step (iii) of the process. The contacting the hydrocracking catalyst with a Fischer-Tropsch product stream having a feed temperature in the range of from 220° C. to 280° C., which is co-fed with the hydrogen-containing stream, preferably occurs for a period of time of at least one hour, such as for a period of time of at least 1 to 10 hours, more preferably 2 to 5 hours, for example for 2 hours. This lower temperature has the advantage of avoiding an unwanted exotherm.

Step (iv) of the present invention is conducted with a Fischer-Tropsch product stream having a feed temperature of from 380° C. to 400° C., preferably from 380° C. to 390° C., for example 385° C. for at least 96 hours. In one embodiment of the present invention, the hydrocracking reaction is carried out at a pressure of between 3 MPa and 8 MPa. Activation of the catalyst is believed to progress to completion whilst the Fischer-Tropsch product stream is co-fed to the reactor having a feed temperature of from 380° C. to 400° C. Co-feeding of the Fischer-Tropsch product stream with feed temperature of 380° C. to 400° C. for at least four days (step (iv)), during activation of the catalyst has been found to allow for the use of lower hydrogen reduction temperatures (step (i)) than typically used in conventional prior art processes, whilst still affording comparable catalyst activity.

The temperature changes performed in the process of the present invention may be performed at a constant rate, in a step-wise manner, and may be held for periods of time during the changing of temperature.

In some embodiments, the hydrocracking catalyst may be contacted with the Fischer-Tropsch product stream at a liquid hourly space velocity (LHSV) of from 0.1 h$^{-1}$ to 10 h$^{-1}$.

In one embodiment, the hydrocracking reaction which follows the initiation procedure in accordance with the present invention is conducted with a Fischer-Tropsch product stream having a feed temperature of about 366° C. at 70 barg, LHSV of 1 h$^{-1}$, and GHSV of 1000 NL/L-h.

The Fischer-Tropsch product stream used for upgrading in accordance with the present invention may be any heavy hydrocarbon fraction provided by a Fischer-Tropsch process. In a preferred embodiment of the present invention, the Fischer-Tropsch product is a Fischer-Tropsch wax. A Fischer-Tropsch wax according to the present invention is deemed to include waxes produced by a Fischer-Tropsch process, comprising a majority of $C_{10}$ to $C_{60}$ paraffinic hydrocarbons.

The invention will now be further illustrated by the following examples and with reference to Tables 1 and 2, as well as the FIGURE.

As used in the examples, the term "Wax Conversion" is defined as:

$$\frac{360+_{Feed} - 360+_{Prod}}{360+_{Feed}}$$

where "360+" is the wt % of material boiling above 360° C. in the feed or product.

The FIGURE shows a comparison of the activity of a catalyst activated at a maximum temperature of 385° C. and at 450° C.

EXAMPLE 1

Activation and Hydrocracking with a CoMo Catalyst According to the Present Invention A hydrocracking catalyst comprising cobalt and molybdenum was activated by flowing hydrogen across the catalyst at a GHSV of 2000 NL/L-h 24 hours at a hydrogen feed temperature of 385° C. After cooling to a feed temperature of 250° C., co-feeding of a Fischer-Tropsch wax was started. The feed temperature was subsequently raised to 370° C., after which hydrocracking was observed, and maintained at this temperature for 1 day, before being raised to 385° C. and being maintained at this temperature for 4 days. Finally the Wax Conversion was determined at various temperatures as shown in Table 1.

TABLE 1

| Wax Conversion after low temperature hydrogen reduction at 385° C. | |
|---|---|
| Temperature [° C.] | Wax Conversion [wt %/wt %] |
| 378 | 91.3 |
| 374 | 81.4 |
| 374 | 78.5 |
| 373 | 75.2 |
| 366 | 56.4 |
| 364 | 46.8 |
| 365 | 49.9 |

COMPARATIVE EXAMPLE A

Activation and Hydrocracking with a CoMo Catalyst not in Accordance with the Present Invention A hydrocracking catalyst comprising cobalt and molybdenum was activated by flowing hydrogen across the catalyst for 12 hours at a of GHSV of 2000 NL/L-h and a hydrogen feed temperature of 450° C. After cooling to a feed temperature of 250° C. the reduced catalyst was subsequently used for hydrocracking by contacting with a Fischer-Tropsch wax having a feed temperature of 368° C. for 10 days, which was subsequently raised to 383° C. for 4 days Finally the Wax Conversion was determined at various temperatures as shown in Table 2.

TABLE 2

| Wax Conversion following high temperature hydrogen reduction at 450° C. | |
|---|---|
| Temperature [° C.] | Wax Conversion [wt %/wt %] |
| 380 | 93.0 |
| 375 | 82.3 |
| 375 | 83.0 |
| 374 | 79.7 |
| 370 | 63.6 |
| 369 | 64.7 |
| 366 | 51.7 |
| 361 | 30.3 |
| 360 | 24.7 |
| 360 | 24.7 |

Wax conversion in the subsequent hydrocracking reactions according to Example 1 and Comparative Example A were determined at the various temperatures used over the course of the upgrading operation. These results are represented graphically in the FIGURE. The FIGURE illustrates that both activation procedures afford a hydrocracking catalyst which exhibits almost identical levels of conversion in the hydrocracking reaction at the different temperatures implemented. Thus, the present invention provides an initiation procedure which affords comparable hydrocracking activity in a hydrocracking process, yet avoids the high-temperature, high-energy activation procedures conventionally used in prior art processes.

The invention claimed is:

1. A process for upgrading a Fischer-Tropsch product stream, said process comprising:
   (i) contacting a hydrocracking catalyst comprising any one of iron, cobalt or nickel with a hydrogen-containing stream having a feed temperature in the range of from 360° C. to 420° C.; then
   (ii) reducing the feed temperature of the hydrogen-containing stream to a temperature in the range of from 220° C. to 280° C.; then
   (iii) contacting the catalyst with the Fischer-Tropsch product stream having a feed temperature in the range of from 220° C. and 280° C. by co-feeding with the hydrogen-containing stream; then
   (iv) contacting the catalyst with the Fischer-Tropsch product stream having a feed temperature in the range of from 380° C. and 400° C. by co-feeding with the hydrogen-containing stream; and then
   (v) contacting the catalyst with the Fischer-Tropsch product stream having a feed temperature in the range of from 360° C. to 420° C.,
   wherein the catalyst is not activated by sulfiding.

2. A process according to claim 1, wherein the hydrocracking catalyst comprises cobalt and further comprises molybdenum.

3. A process according to claim 1, wherein the hydrocracking catalyst is contacted with the hydrogen-containing stream in step (i) for a period in the range of from 6 to 36 hours.

4. A process according to claim 1, wherein the catalyst comprises a support.

5. A process according to claim 1, wherein the feed temperature of the hydrogen-containing stream in step (i) is in the range of from 360° C. to 420° C.

6. A process according to claim 1, wherein Fischer-Tropsch product stream in step (iv) has a feed temperature in the range of from 380° C. to 400° C.

7. A process according to claim 1, wherein step (iv) is operated for a period of at least 96 hours.

8. A process according to claim 1, wherein the feed temperature of the hydrogen-containing stream in step (ii) and/or the feed temperature of the Fischer-Tropsch product stream in step (iii) is in the range of from 240° C. to 260° C.

9. A process according to claim 1, wherein the Fischer-Tropsch product stream comprises a Fischer-Tropsch wax.

10. A process according to claim 1, wherein the hydrogen-containing stream comprises a stream of at least 50 wt. % hydrogen, with the balance being made up of inert gas diluents.

11. A process according to claim 1, wherein the hydrocracking catalyst may be contacted with the hydrogen-containing stream in steps (i) through (iv) at a pressure in the range of from atmospheric pressure to 10 MPa.

12. A process according to claim 1, wherein the hydrocracking catalyst is contacted with the hydrogen-containing stream in step (i) for a period in the range of from 20 to 30 hours.

13. A process according to claim 1, wherein the catalyst comprises a support selected from the group consisting of silica, alumina, silica/alumina, zeolites, ceria, zirconia, titania, and zinc oxide.

14. A process according to claim 1, wherein the feed temperature of the hydrogen-containing stream in step (i) is in the range of from 360° C. to 390° C.

15. A process according to claim 1, wherein Fischer-Tropsch product stream in step (iv) has a feed temperature in the range of from 380° C. to 390° C.

16. A process according to claim 1, wherein the feed temperature of the hydrogen-containing stream in step (ii) and/or the feed temperature of the Fischer-Tropsch product stream in step (iii) is in the range of from 245° C. to 255° C.

17. A process according to claim 1, wherein the hydrogen-containing stream comprises a stream of at least 95 wt. % hydrogen, with the balance being made up of inert gas diluents.

* * * * *